US005325486A

United States Patent [19]

Omori et al.

[11] Patent Number: 5,325,486

[45] Date of Patent: Jun. 28, 1994

[54] APPARATUS FOR TRANSFERRING BLOCKS OF IMAGE DATA

[75] Inventors: Mutsuhiro Omori, Kanagawa; Koichi Tanaka; Toshihiko Kawai, both of Tokyo, all of Japan

[73] Assignee: Sony Corporation, Tokyo, Japan

[21] Appl. No.: 772,832

[22] Filed: Oct. 8, 1991

[30] Foreign Application Priority Data

Oct. 8, 1990 [JP] Japan ................................ 2-270318

[51] Int. Cl.$^{5}$ ................................ G06F 15/62

[52] U.S. Cl. ................................ 395/164; 395/166; 395/400

[58] Field of Search ............... 395/162, 163, 164, 165, 395/166, 400, 138, 127; 340/723, 789, 798, 799; 345/200, 185, 203

[56] References Cited

U.S. PATENT DOCUMENTS

| | | | |
|---|---|---|---|
| 4,841,435 | 1/1989 | Papenberg | 395/250 |
| 4,845,656 | 7/1989 | Nishibe et al. | 395/166 |
| 4,882,683 | 11/1989 | Rupp et al. | 395/165 |
| 4,916,301 | 4/1990 | Mansfield et al. | 395/162 |
| 5,007,102 | 4/1991 | Haskell | 382/56 |
| 5,034,900 | 7/1991 | Kimura et al. | 395/166 |
| 5,095,446 | 3/1992 | Jingu | 395/165 |
| 5,175,816 | 12/1992 | Kimura et al. | 395/166 |

*Primary Examiner*—Arthur G. Evans
*Assistant Examiner*—Kee M. Tung
*Attorney, Agent, or Firm*—Hill, Steadman & Simpson

[57] ABSTRACT

A bit map display system has a frame buffer memory for storing image data in pixel blocks each composed of a plurality of dots or pixels. To transfer image data from a source address region to a destination address region, block addresses are generated from relative addresses of starting and ending pixel points in the source address region and relative addresses of starting and ending pixel points in the destination address region, and supplied to the frame buffer memory. A decision circuit generates a pre-reading signal and a non-reading signal from the relative addresses depending on the direction in which the image data are to be transferred. The pre-reading and non-reading signals are set according to certain predetermined conditions. The image data are transferred from the source address region to the destination address region in the frame buffer memory in various ways depending on whether the pre-reading and non-reading signals are set or not.

1 Claim, 7 Drawing Sheets

FIG. 3A
FIG. 3B
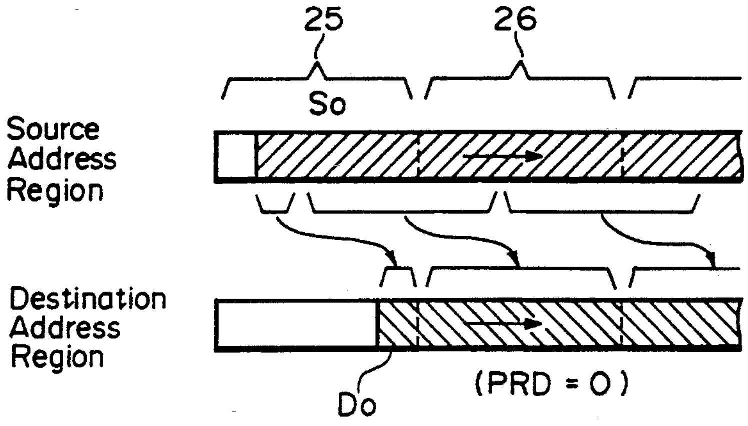
FIG. 4A
FIG. 4B
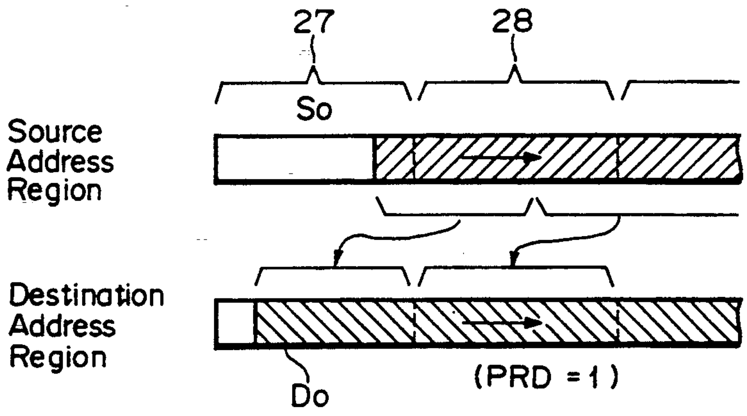

FIG. 7A ( NRD = 1 )
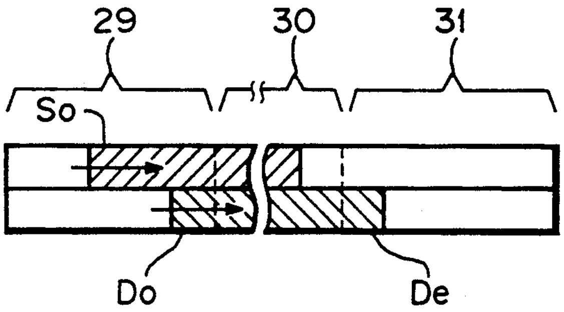
FIG. 7B ( NRD = 0 )
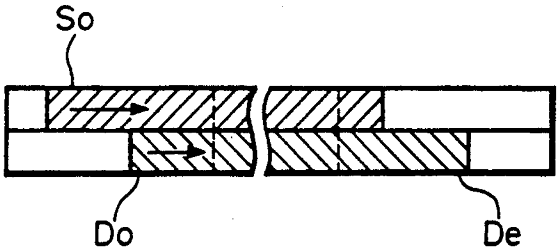
FIG. 7C ( NRD = 1 )
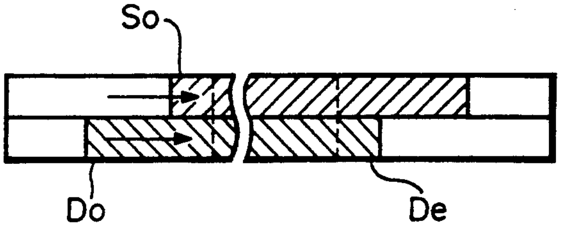
FIG. 7D ( NRD = 0 )
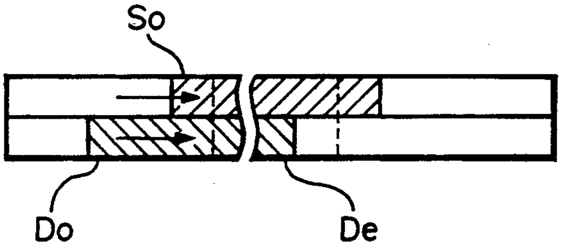

FIG. 9A (NRD = 1)
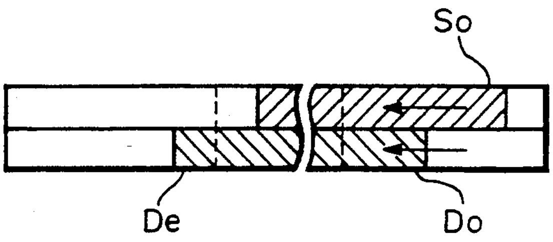
FIG. 9B (NRD = 0)
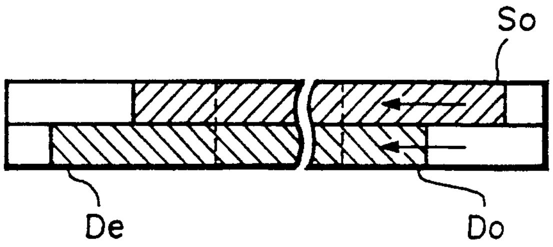
FIG. 9C (NRD = 1)
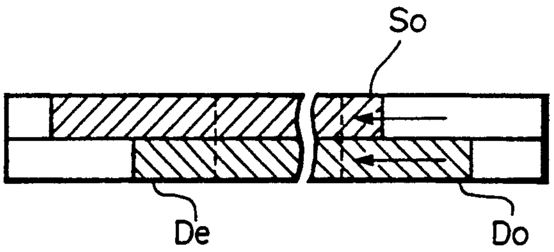
FIG. 9D (NRD = 0)
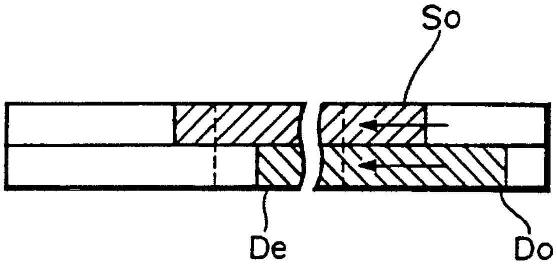

APPARATUS FOR TRANSFERRING BLOCKS OF IMAGE DATA

BACKGROUND OF THE INVENTION

1. Field of the Invention

The present invention relates to an apparatus for transferring blocks of image data.

2. Description of the Prior Art

In usual bit map display systems, one frame of image data is written into a frame buffer (FB) memory which comprises a dynamic RAM, and the image data are successively read from the frame buffer memory and supplied to a display unit such as a CRT, which displays on its display screen an image represented by the image data. The displayed image is made up of a plurality of picture elements or pixels corresponding respectively to the image data which are stored at respective addresses of the frame buffer memory.

CRTs for use as graphic display terminals in CAD, CAM, and other similar applications have high resolutions, for example, of 1280×1024 dots. When such a CRT is scanned by the noninterlacing scanning process at a frequency of 60 Hz, a dot clock signal used to read one dot pixel from the frame buffer memory is required to have a frequency in excess of 100 MHz (i.e., a period in excess of 10 ns). However, since the dynamic RAM used as the frame buffer memory can be accessed at a speed which is much lower than the above frequency, it is customary practice to access a plurality of dynamic RAM chips simultaneously in one access cycle for reading image data representing plural dots at one time.

The image data of plural dots which have simultaneously been read are then supplied to a high-speed shift register. The image data stored in the shift register are successively read with the dot clock signal and supplied to the CRT. In this manner, the low access speed of the dynamic RAM is compensated for.

In view of recent microprocessors available with wider buses, it has become possible to write image data representing plural dots simultaneously into a frame buffer memory. The image data stored in the frame buffer memory are allotted addresses such that a group of image data representing plural dots corresponds to one address. It is customary to group a horizontal array of successive pixels, the number of which is represented by a power of 2. For example, one address is assigned to each horizontal array of successive pixels that represent 16 dots.

FIG. 1 of the accompanying drawings shows a structure of image data stored in a frame buffer memory, the image data being divided into groups of pixels representing 16 dots. In the frame buffer memory, a plurality of one-dot image data 1 are arranged in horizontal and vertical directions (indicated respectively by the arrows X and Y) which correspond to those on a display screen. The image data 1 are divided in the horizontal direction into pixel blocks 2A, 2B, 2C, . . . each composed of 16 pixels or dots. In each of the pixel blocks 2A, 2B, 2C, . . . , the image data which are 16 dots long in the horizontal direction and one dot long in the vertical direction are allotted one address. Therefore, the groups or units of image data which are 16 dots long in the horizontal direction and one dot long in the vertical direction are written into and read out of the frame buffer memory, one at a time.

It is assumed that image data representing a plurality of dots are to be transferred from one address region to another address region for translating a displayed image of an object on a display screen. If the address region from which the image data are to be transferred, i.e., the source address region, adjoins the boundaries of a pixel block composed of 16 pixels, and the address region to which the image data are to be transferred, the destination address region, adjoins the boundaries of another pixel block, then the image data can easily be transferred. Such a transfer of the image data can be carried out by reading one pixel block, writing one pixel block, reading one pixel block, . . . , reading one pixel block, and writing one pixel block.

More specifically, image data 3 (FIG. 1) corresponding to 16×2 dots can be transferred from an address region P1 adjoining the boundaries of the pixel block 2A to an address region P2 adjoining the boundaries of the pixel block 2B simply by reading and writing image data corresponding to 16 dots in two repetitive cycles.

However, if image data are to be transferred from or to an address region which does not adjoin a pixel block, then the process of transferring the image data is much more complex.

Specifically, as shown in in FIG. 1, it is assumed that image data 4 are to be transferred, from the righthand to the lefthand end of an address region P3, to an address region P4. Image data 5B in the source address region P3 within the pixel block 2B are three dots long in the horizontal direction, whereas image data 6A in the destination address region P4 within the pixel block 2C are nine dots long in the horizontal direction. The image data (including the image data 5B) in the pixel block 2B and the image data 5A in the pixel block 2A are pre-read from the source address region P3, and image data (including the image data 6A) produced by processing the two image data groups thus pre-read are written into the pixel block 2C in the destination address region P4.

Image data 6B at the lefthand end of the destination address region P4 are one dot long in the horizontal direction. Since the image data 6B have already been pre-read from the source address region P3, the step of reading the image data again may possibly be omitted. For the transfer of image data irrespective of the boundaries of the pixel blocks, as described above, the transfer procedure (transfer efficiency) may be optimized for an increased transfer rate by employing the pre-reading process or the like. Heretofore, no consideration has been given to optimization of the transfer efficiency.

OBJECTS AND SUMMARY OF THE INVENTION

In view of the aforesaid problems of the conventional process of image data transfer, it is an object of the present invention to provide an apparatus for transferring, i.e., writing and reading, pixel blocks of image data representing a plurality of dots or pixels in an image memory, with an optimized transfer efficiency particularly when the image data are transferred from an address region where the image data are stored in a fractional region to another address region.

According to the present invention, there is provided an apparatus for transferring blocks of image data, comprising an image memory having blocks each composed of a plurality of dots, the blocks being indicated by respective block addresses, source address control means for storing relative addresses of starting and ending pixel points in a source address region containing image data to be transferred, and for supplying the block addresses of blocks between the relative addresses of the starting and ending pixel points in the source address region successively to the image memory, destination address control means for storing relative addresses of starting and ending pixel points in a destination address region to which the image data are to be transferred, and for supplying the block addresses of blocks between the relative addresses of the starting and ending pixel points in the destination address region successively to the image memory, image data transferring means for processing and writing the image data read from the blocks indicated by the block addresses in the source address region in the image memory into the blocks indicated by the block addresses in the destination address region in the image memory, and decision means for generating a pre-reading signal and a non-reading signal from the relative address So of the starting pixel point in the source address region, the relative address Do of the starting point in the destination address region, and the relative address De of the engine point in the destination address region, the decision means comprising means for setting the pre-reading signal if the condition:

$$Do < So$$

is satisfied when the image data are to be transferred in a direction in which addresses increase, or if the condition:

$$So < Do$$

is satisfied when the image data are to be transferred in a direction in which addresses decrease, the decision means further comprising means for setting the non-reading signal if the condition:

$$Do \neq So$$

and $$De < (Do - So)$$

with a code bit neglected, or if the condition:

$$Do \neq So$$

and $$De \geqq (Do - So)$$

with the code bit neglected, the image data transferring means comprising means for reading image data corresponding to first two blocks in the source address region in the image memory and generating image data corresponding to a first block in the destination address region from the image data corresponding to the first two blocks when the pre-reading signal is set, the image data transferring means further comprising means for writing image data corresponding to a final block in the destination address region in the image memory without reading final image data from the image memory when the non-reading signal is set.

The decision means for generating the pre-reading signal and the non-reading signal depending on the direction in which to transfer the image data allows the image data to be transferred in blocks with optimized transfer efficiency at increased transfer rate even if the image data include image data stored in a fractional region in a block.

The above and other objects, features, and advantages of the present invention will become apparent from the following description of an illustrative embodiment thereof to be read in conjunction with the accompanying drawings, in which like reference numerals represent the same or similar objects.

BRIEF DESCRIPTION OF THE DRAWINGS

FIGS. 3A, 3B and 4A, 4B are diagrams illustrative of a pre-reading signal PRD produced when image data are transferred in a rightward direction (i.e., a direction in which addresses are increased);

FIGS. 7A through 7D are diagrams illustrative of a non-reading signal NRD produced when image data are transferred in a rightward direction (i.e., a direction in which addresses are increased);

FIGS. 9A through 9D are diagrams illustrative of a non-reading signal NRD produced when image data are transferred in a leftward direction (i.e., a direction in which addresses are reduced).

DETAILED DESCRIPTION OF THE PREFERRED EMBODIMENT

Figure 1:
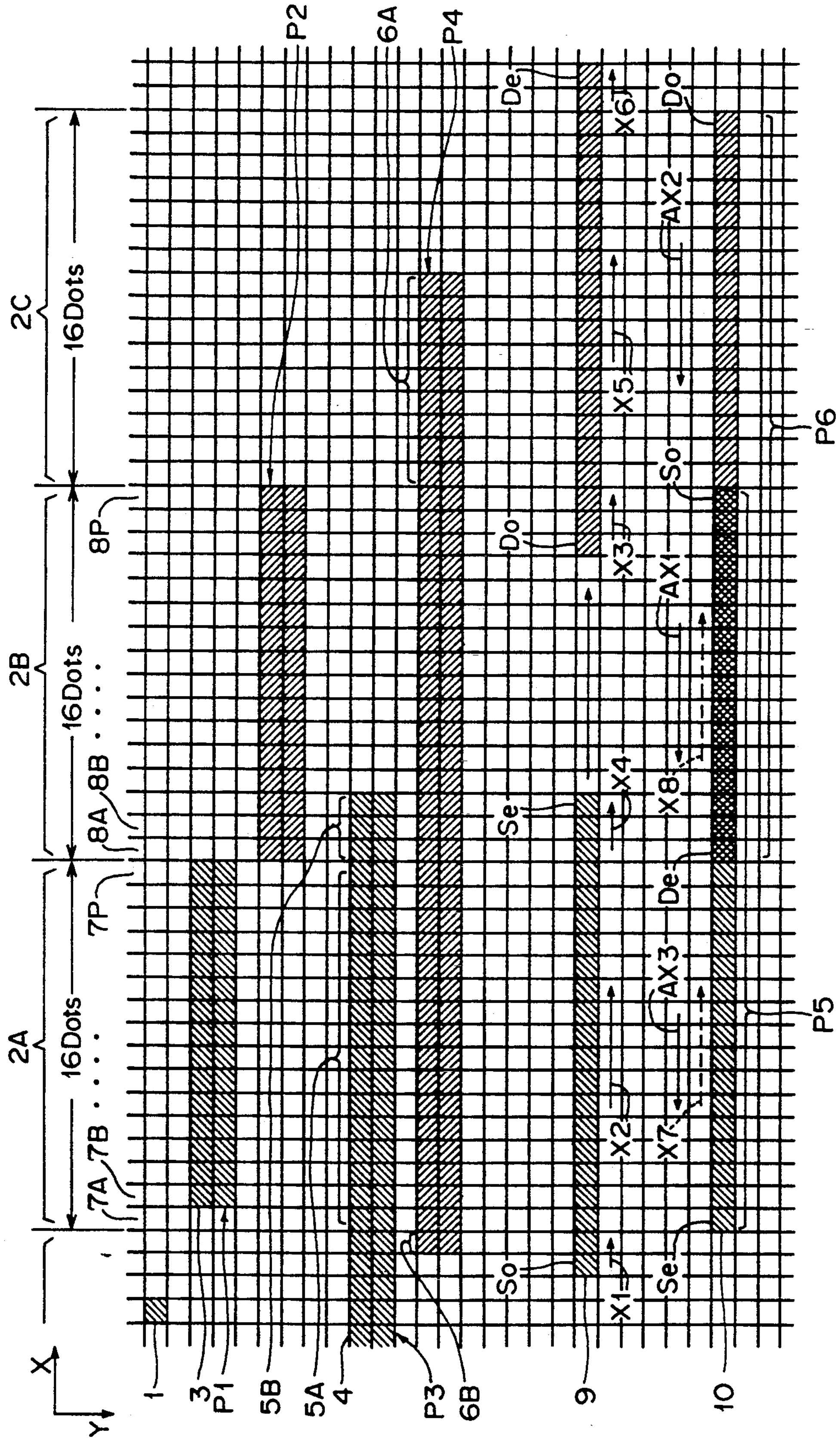
FIG. 1 is a diagram showing a structure of image data in a frame buffer memory.

The principles of the present invention are applied to a bit map display system having a frame buffer memory which writes and reads image data in pixel blocks each composed of 16 dots or pixels as shown in FIG. 1.

The image data shown in FIG. 1 are not divided into blocks in the direction indicated by the arrow Y. Image data can be transferred in the direction indicated by the arrow Y, which corresponds to the vertical direction on the display screen simply by varying the vertical address of the image data. Therefore, only the transfer of image data on a single horizontal line in the direction indicated by the arrow X (i.e., the horizontal direction on the display screen) will be described below without concern over the vertical addresses.

Prior to a detailed description of the embodiment of the present invention, various terms used with regard to address regions will first be defined below.

Addresses in the frame buffer memory are divided into "block addresses" and "relative addresses." The block addresses are assigned to respective regions, which are one dot long in the vertical direction, corresponding to the pixel blocks 2A, 2B, . . . each composed of horizontally successive 16 dots or pixels, as with the conventional data arrangement in the frame buffer memory. Image data are written into and read out of the frame buffer memory, one block at a time. The relative addresses are indicative of the horizontal relative position of each pixel in the pixel blocks each composed of 16×1 dots. A relative address is indicated by one of integers 0, 1, 2, ~, 14, 15. In FIG. 1, the block addresses and the relative addresses are established such that the values of the addresses are progressively increased to the right in the horizontal direction indicated by the arrow X. For example, pixels 7A, 8A at the lefthand ends of the pixel blocks 2A, 2B, respectively, have a relative address of 0, pixels 7B, 8B positioned on the righthand side of the pixels 7A, 8B, respectively, have a relative address of 1, and pixels 7P, 8P at the righthand ends of the pixel blocks 2A, 2B, respectively, have a relative address of 15.

A combination of block and relative addresses, which is used to define fully the position of any pixel in the frame buffer memory, is referred to as an "absolute address."

A relative address of a starting point of a source address region where the transfer of image data starts is indicated by So, a relative address of an ending point of the source address region where the transfer of image data ends by Se, a relative address of a starting point of a destination address region by Do, and a relative address of an ending point of the destination address region by De. For example, if image data 9 is to be transferred from a source address region to a destination address region which does not overlap the source address region, as shown in FIG. 1, then the image data 9 can be transferred successively to the right (in the direction in which the addresses are increased), i.e., read in the direction indicated by the arrow X1, then read in the direction indicated by the arrow X2, written in the direction indicated by the arrow X3, read in the direction indicated by the arrow X4, written in the direction indicated by the arrow X5, and written in the direction indicated by the arrow X6. Therefore, the starting points of the source and destination address regions are positioned on the lefthand side of the ending points thereof.

It is now assumed that image data 10 which are two pixel blocks long are to be transferred from a source address region P5 which is composed of two successive pixel blocks to a destination address region P6 which is also composed of two successive pixel blocks, the address regions P5, P6 sharing one pixel block 2B. If the image data were read in the direction indicated by the arrow X7 and written in the direction indicated by the arrow X8, then the image data previously stored in the pixel block 2B in the source address region P5 would be lost. Therefore, it is necessary to transfer the image data successively to the left (in the direction in which the addresses are reduced), i.e., read in the direction indicated by the arrow AX1, then written in the direction indicated by the arrow AX2, read in the direction indicated by the arrow AX3, and written in the direction indicated by the arrow AX1. Accordingly, the starting points of the source and destination address regions have to be positioned on the righthand side of the ending points thereof.

Figure 2:
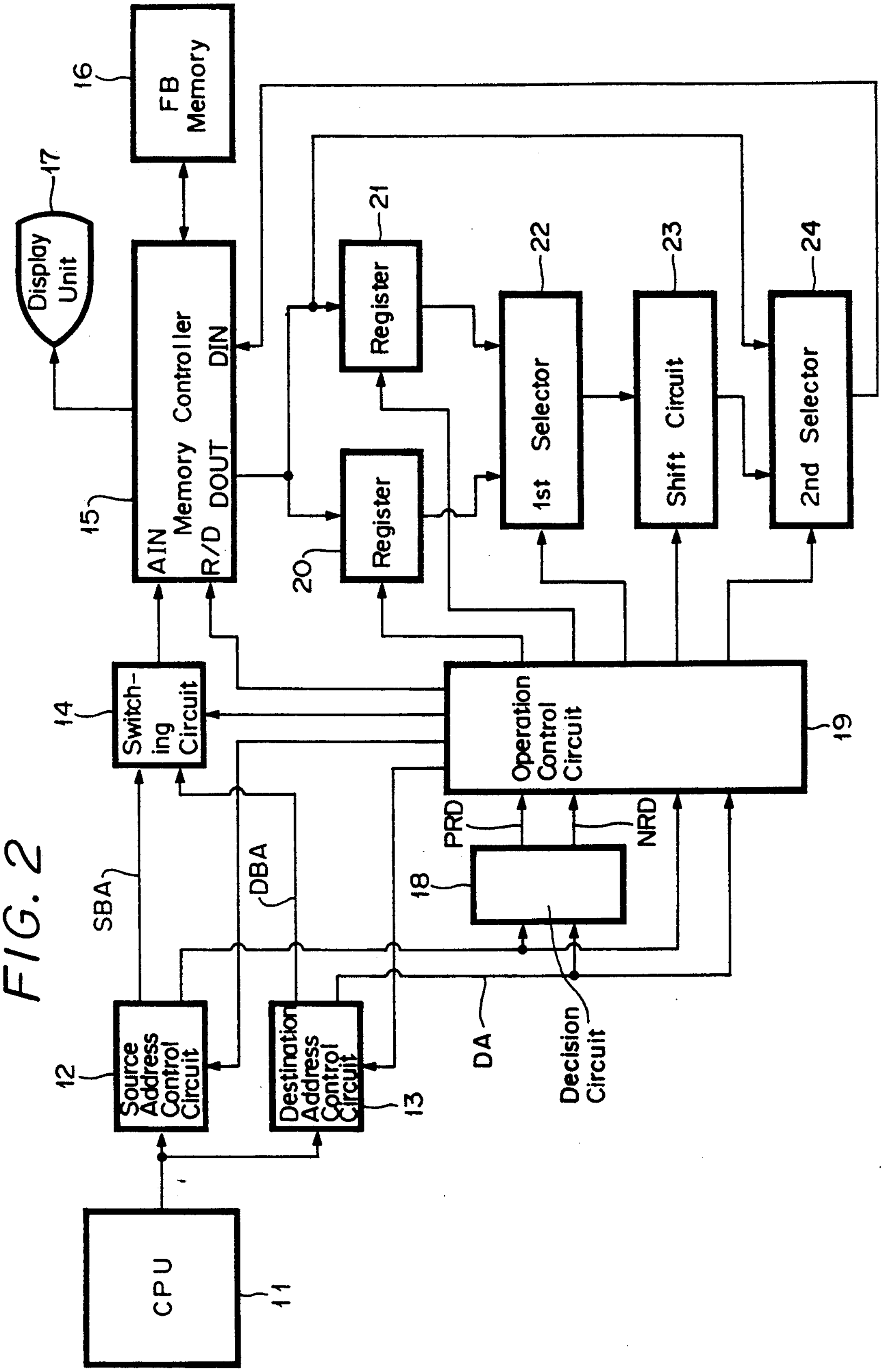
FIG. 2 is a block diagram of an apparatus for transferring blocks of image data according to the present invention.

FIG. 2 shows in block form a bit map display system which incorporates an apparatus for transferring blocks of image data according to the present invention. The bit map display system includes a central processing unit (CPU) 11 for controlling operation of the entire bit map display system, a source address control circuit 12, and a destination address control circuit 13. The CPU 11 supplies the source address control circuit 12 with absolute addresses SA of starting and ending points of a source address region from which image data are to be transferred, and also supplies the destination address control circuit 13 with absolute addresses DA of starting and ending points of a destination address region to which image data are to be transferred. The source address control circuit 12 generates a block address SBA of the source address region from the absolute address SA, and supplies the generated block address SBA to a switching circuit 14. The destination address control circuit 13 generates a block address DBA of the destination address region from the absolute address DA, and supplies the generated block address DBA to the switching circuit 14.

The bit map display system also includes a memory controller 15, a frame buffer (FB) memory 16, and a display unit 17 such as a CRT or the like. The block address SBA or DBA is supplied through the switching circuit 14 to an address input terminal of the memory controller 15. In response to the supplied block address SBA or DBA, the memory controller 15 transfers image data in the frame buffer memory 16 during a horizontal blanking period, for example. During a normal scanning period, the memory controller 15 converts image data, which are read successively in units of 16 dots from the frame buffer memory 16, into serial image data each composed of one dot, and supplies the serial image data to the display unit 17.

A decision circuit 18 and an operation control circuit 19 are supplied with absolute addresses SA of the source address region and absolute addresses DA of the destination address region from the source address control circuit 12 and the destination address control circuit 13, respectively. The decision circuit 18 separates relative addresses So, Se of the starting and ending points of the source address region from the absolute addresses SA, and also separates relative addresses Do, De of the starting and ending points of the destination address region from the absolute addresses DA. If the relative address So of the starting point is positioned horizontally on the left-hand side of the relative address Se of the ending point, then the direction in which the image data are to be transferred is the direction in which the addresses are increased. Conversely, if the relative address So of the starting point is positioned horizontally on the righthand side of the relative address Se of the ending point, then the direction in which the image data are to be transferred is the direction in which the addresses are reduced. In this manner, the decision circuit 18 can recognize the direction in which image data are to be transferred.

The decision circuit 18 generates a pre-reading signal PRD and a non-reading signal NRD from the relative addresses So, Do, De and the direction in which the image data are to be transferred, in the manner described later on, and supplies these pre-reading and non-reading signals PRD, NRD to the operation control circuit 19. The operation control circuit 19 increments the block addresses from the address control circuits 12, 13 successively by "1", controls the switching operation of the switching circuit 14, generates a control signal to be supplied to a read/write terminal of the memory controller 15, and controls a data transfer circuit described below.

The data transfer circuit comprises registers 20, 21, a first selector 22, a shift circuit 23, and a second selector 24. Each of the registers 20, 21 holds holding image data composed of 16 dots. The first selector 22 is supplied with and outputs image data composed of 32 dots or pixels (which are two pixel blocks long). The registers 20, 21 have respective parallel data input terminals connected to a data output terminal of the memory controller 15, and respective parallel data output terminals connected to different data input terminals, respectively, of the first selector 22. The first selector 22 supplies the image data, which are applied to its data input terminals, directly or with righthand and lefthand pixel groups switched around, from its data output terminal to the shift circuit 23.

The shift circuit 23 shifts the supplied image data composed of 32 dots to the right or left by a predetermined number of dots based on an instruction from the operation control circuit 19, and supplies the shifted image data to its output data terminal. The second selector 24 has a data input terminal which is supplied with parallel image data composed of 48 dots and a data output terminal which outputs image data composed of 16 dots (i.e., one pixel block). The data output terminal of the shift circuit 23 is connected to a portion of the data input terminal of the second selector 24, and the data output terminal of the memory controller 15 is connected to the remainder of the data input terminal of the second selector 24. The second selector 24 has a data output terminal connected to a data input terminal of the memory controller 15.

Operation of the data transfer circuit of the above structure will be described below.

First, a process of pre-reading image data will be described below with reference to FIGS. 3A, 3B through 6A, 6B. A normal memory cycle in the transfer of image data starts as follows: One pixel block is read from a source address region, then one pixel block is written into a destination address region, one pixel block is read, and one pixel block is written. However, not all image data to be written at first may be available in one reading step. The term "pre-reading" means reading image data from two pixel blocks in a source address region at the first stage of the transfer of the image data in response to the pre-reading signal PRD, which is of a high level of "1", from the decision circuit 18.

The level of the pre-reading signal PRD becomes "1" if the number of pixels, which are to be transferred, in a leading pixel block in a source address region is smaller than the number of pixels, which have been transferred, in a leading pixel block in a destination address region. The above condition will specifically be reviewed below both when the direction in which to transfer the image data is a rightward direction (the direction in which the addresses are increased, i.e., So<Se) and when the direction in which to transfer the image data is a leftward direction (the direction in which the addresses are reduced, i.e., So>Se) in this embodiment.

FIG. 3A shows image data on a horizontal line in a source address region whose starting point has a relative address So before the image data are transferred, and FIG. 3B shows image data on a horizontal line in a destination address region whose starting point has a relative address Do after the image data are transferred. Therefore, FIGS. 3A and 3B show the transfer of the image data in a rightward direction under the condition of So≦Do. In FIGS. 3A and 3B, the absolute addresses in the horizontal direction increase to the right. Broken lines in FIGS. 3A and 3B represent boundaries between pixel blocks. The image data (shown hatched) to be transferred from the source address region are divided horizontally in the pixel blocks, denoted at 25, 26, . . . The image data (shown hatched) transferred to the destination address region are also divided in the pixel blocks. In this embodiment, the source address region and the destination address region are actually spaced horizontally apart from each other by n pixel blocks (n=0, ±1, ±2, . . . Since the image data can be moved horizontally by an interval corresponding to the n pixel blocks only by writing the image data into the frame buffer memory with an offset corresponding to the n pixel blocks, the relative address So and the relative address Do are shown as belonging to the same pixel address for illustrative purpose.

In FIGS. 3A and 3B, since So≦Do, the lefthand end of the hatched image data read from the leading pixel block 25 in the source address region becomes the hatched image data in the leading pixel block 25 in the destination address region. Therefore, it is not necessary to pre-read the image data from the source address region, and the pre-reading signal PRD is of a low level of "0".

If the relative address So of the starting point of the source address region (see FIG. 4A) and the relative address Do of the starting point of the destination address region (see FIG. 4B) satisfy the following relationship:

$$Do < So \qquad (1),$$

then image data read from a leading pixel block 27 in the source address region are not large enough to be image data to be written in the leading pixel block 27 in the destination address region. Therefore, it is necessary that the image data in two leading pixel blocks 27, 28 in the source address region be read, and the image data to be written in the leading pixel block 27 in the destination address region be generated from the image data thus read from the two pixel blocks 27, 28. Consequently, if the relationship according to the inequality (1) is met, then the decision circuit 18 sets the pre-reading signal PRD to the high level of "1".

A flow of image data in the data transfer circuit (composed of the circuit components 20~24 in FIG. 2) at the time the image data are pre-read as shown in FIGS. 4A and 4B will be described below with reference to FIGS. 2 and 5. When the pre-reading signal PRD is of the high level of "1", the operation control circuit 19 controls the source address circuit 12 to supply the block addresses SBA of two leading pixel blocks in the source address region to the memory controller 15, and also controls the memory controller 15 to read the image data in the two pixel blocks successively from the frame buffer memory 16 and controls the registers 20, 21 to hold the read image data from the memory controller 15, respectively. At this time, the image data, which are the same as the image data representing a background image, for example, are written in the two leading pixel blocks in the source address region in the frame buffer memory 16.

Figure 5:
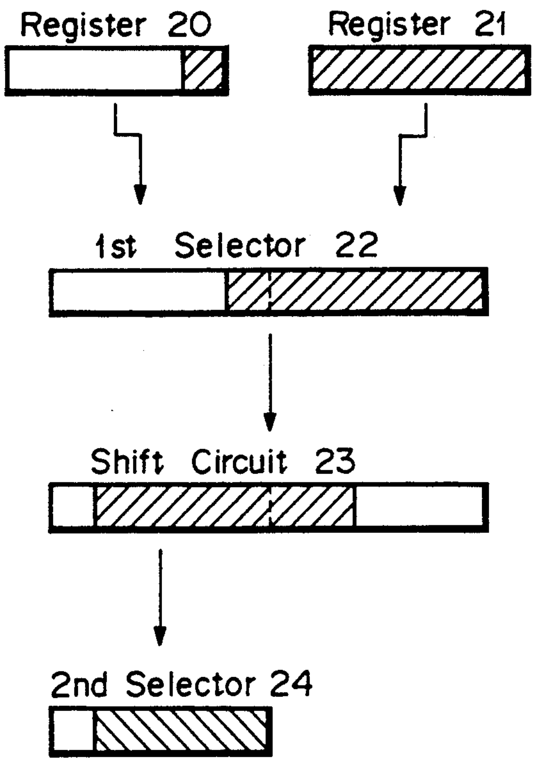
FIG. 5 is a diagram showing a flow of image data when they are pre-read.

As shown in FIG. 5, the registers 20, 21 now hold the image data in the respective pixel blocks 27, 28. The first selector 22 outputs the image data from the registers 20, 21 parallel as they are, and the parallel image data from the first selector 22 are shifted to the left by an interval corresponding to (So−Do) in the shift circuit 23. The lefthand image data, corresponding to 16 dots, of the shifted image data are selected by the second selector 24, and the selected image data are written into the leading pixel block in the destination address region in the frame buffer memory 16. The transfer of the image data in the leading pixel blocks is now completed.

Figure 6A:
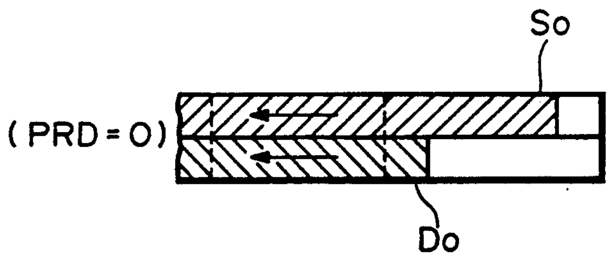
FIGS. 6A and 6B are diagrams illustrative of a pre-reading signal PRD produced when image data are transferred in a leftward direction (i.e., a direction in which addresses are reduced)
Figure 6B:
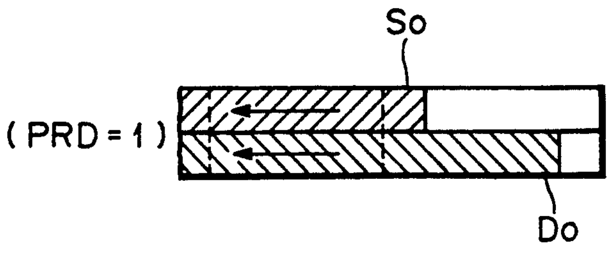

FIGS. 6A and 6B show the manner in which image data are to be transferred in a leftward direction (i.e., a direction in which the addresses are reduced). In this case, Se<So. If the relative address So of the starting point of a source address region and the relative address Do of the starting point of a destination address region meet the relationship Do≦So as shown in FIG. 6A, then, the image data in a leading pixel block in the destination address region is contained in the image data in a leading pixel block in the source address region. Therefore, it is not necessary to pre-read the image data, and the decision circuit 18 sets the pre-reading signal PRD to the low level of "0."

If the relative addresses So, Do satisfy the following relationship:

$$So<Do \quad (2),$$

then since the image data are to be pre-read, the decision circuit 18 sets the pre-reading signal PRD to the low level of "1."

Now, a process of non-reading image data will be described below with reference to FIGS. 7A, 7B, 7C, 7D through 9A, 9B, 9C, 9D. A normal memory cycle in the transfer of image data ends as follows: One pixel block is read, then one pixel block is written, . . . , one pixel block is read from a source address region, and one pixel block is written into a destination address region. However, inasmuch as image data to be written finally may have already been read according to the optimized image data transfer, the memory cycle may end as follows: One pixel block is read, then one pixel block is written, . . . , one pixel block is written into a destination address region, and one pixel block is written into the destination address region. Therefore, one reading cycle may be dispensed with. In this case, the decision circuit 18 sets the non-reading signal NRD to the high level of "1."

The level of the non-reading signal NRD becomes "1" depending on whether or not the number of pixels corresponding to the image data that have excessively been pre-read from a source address region is greater than the number of pixels that exist in a final pixel block in a destination address region. If conditions such as a sufficient amount of pre-read image data are satisfied, then the final reading cycle may be omitted. These conditions include the following two conditions:

(a) If the number of pixel blocks occupied by a source address region is smaller than the number of pixel blocks occupied by a destination address region by 1; and (b) If image data have been pre-read from a source address region at the first stage of image data transfer even though the number of pixel blocks occupied by a source address region is the same as the number of pixel blocks occupied by a destination address region.

In order to achieve a process of determining the above two conditions, the image transfer will be reviewed below both when the direction in which to transfer the image data is a rightward direction (the direction in which the addresses are increased) and when the direction in which to transfer the image data is a leftward direction (the direction in which the addresses are reduced) in this embodiment. In this embodiment, each pixel block contains image data composed of 16 dots, and each of the relative addresses So, Do, De can be represented by a 4-bit binary number (whose value ranges from 0 to 15), but is smaller than 16.

FIGS. 7A through 7D show image data to be transferred in a rightward direction, with the horizontal absolute addresses increasing to the right. Broken lines in FIGS. 7A through 7D represent boundaries between pixel blocks. The image data in the source address region are divided horizontally in the pixel blocks, denoted at 29, 30, 31. The image data in the designation address region are also divided in the pixel blocks. As with the image data shown in FIGS. 3A and 3B, the starting point of the source address region and the starting address of the destination address region are shown as belonging to the same pixel address for illustrative purpose.

FIG. 7A shows image data with So<Do, the number of pixel blocks occupied by image data (shown hatched) to be transferred from the source address region being smaller than the number of of pixel blocks occupied by image data (shown hatched) transferred to the destination address region by 1. In this case, a cycle of reading any image data from the pixel block at the righthand end of the source address region can be dispensed with, and the decision circuit 18 sets the non-reading signal NRD to the high level of "1."

In FIG. 7B, an amount of saved image data (indicated by a value produced by subtracting the number of dots of written image data from the number of dots of read image data) is equal to (Do−So) dots, and the final pixel block 31 in the destination address region contains (De+1) dots. Since the final reading cycle can be omitted, the following relationship is satisfied:

$$(De+1)\leqq(Do-So) \quad (3).$$

For example, if So=4 and Do=8, then since Do−-So=4, then the non-reading signal NRD has a high level of "1" when the value of De ranges from 0 to 3 according to the formula (3), making it possible to omit the final reading cycle. If, however, De is 4, then since the formula (3) is not satisfied, the level of the non-reading signal NRD becomes "0", and the final reading cycle is required.

If So=Do, then since the image data has the same length before and after they are transferred, the equation De=Se is satisfied. Therefore, it is not necessary to pre-read the image data, no excessive image data have been read, and it is not possible to dispense with the final reading cycle, with the result that the non-reading signal NRD has the low level of "0."

FIG. 7C shows image data with Do<So, the number of pixel blocks occupied by image data to be transferred from the source address region being equal to the number of of pixel blocks occupied by image data transferred into the destination address region. In this case, since the image data in one pixel block have been pre-read as with the image data transfer shown in FIGS. 4A and 4B and the final reading cycle in the source address region can be omitted, the non-reading signal NRD is set to the high level of "1." The amount of saved image data in the pre-reading cycle is equal to {16−(So−-Do)}, and the final pixel block in the destination address region contains (De+1) dots. Since the final reading cycle can be dispensed with, the following relationship is satisfied:

$$(De+1)\leqq\{16-(So-Do)\} \quad (4).$$

However, if the source address region occupies pixel blocks that are one more than the pixel blocks occupied by the destination address region as shown in FIG. 7D, even though Do<So, then since the final reading cycle cannot be omitted, the non-reading signal NRD is set to the low level of "0."

For example, if Do=4, So=8, since So−Do=4, then the non-reading signal NRD has a high level of "1" when the value of De ranges from 0 to 11 according to the formula (4), resulting in non-reading of image data. If, however, De is 12, then since the formula (4) is not satisfied, the level of the non-reading signal NRD becomes "0", and non-reading of image data does not take place.

The above conditions are summarized as follows: In order for the non-reading signal NRD to be of the high level of "1" when the image data are to be transferred in the direction in which the addresses increase, the following condition (c) must be satisfied:

Condition (c):

$$\{So<Do \text{ and } (De+1)\leqq(Do-So)\}$$

or $$\{Do<So \text{ and } (De+1)\leqq(16-(So-Do)\}.$$

The condition (c) may be modified into the following condition (d):

Condition (d):

$$\{So<Do \text{ and } (De<(Do-So)\}$$

or $$\{Do<So \text{ and } (So-Do)<(16-De)\}.$$

To simplify the formula:

$$(So-Do)<(16-De) \quad (5)$$

in the above condition (e), both sides of the formula (5) are multiplied by −1, resulting in the following formula (5A):

$$(Do-So)>(De-16) \quad (5A).$$

By adding 16 to both sides of the formula (5A), the following equation is obtained:

$$(Do-So+16)>De \quad (5B).$$

Each of the relative addresses So, Do, De can have a value ranging from 0 to 15. When the formula (5) and the formula (5B) are satisfied, the relationship Do−So<0 is satisfied. When Do−So<0, since a code bit (fifth bit) is 1 and the fifth bit of a value 16 is 1 according to the twos complement representation, (Do−So+16) in the formula (5B) may be handled as a positive number while neglecting the code bit of (Do−So). Therefore, the formula (5B) can be rewritten as follows:

$$De<(Do-So) \text{ (with the code bit neglected)} \quad (5C).$$

For example, when Do=2 and So=4, (Do−So)=(11110) and (Do−So+16)=(01110) according to the twos complement representation. The numerical value (01110) is equivalent to what is obtained by neglecting the fifth bit of the numerical value (11110).

Therefore, the condition (d) can be simplified into the following condition (e):

Condition (e):

$$Do\neq So$$

and $$De<(Do-So)$$

with the code bit neglected.

Figure 8:
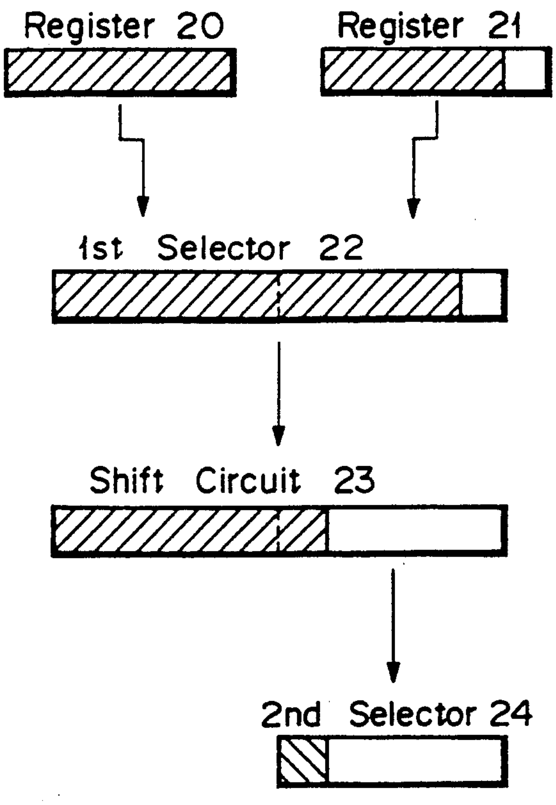
FIG. 8 is a diagram showing a flow of image data when they are non-read.

A flow of image data in the data transfer circuit shown in FIG. 2 at the time image data are non-read in the image data transfer shown in FIG. 7A will be described below with reference to FIG. 8.

When image data are to be written into the final pixel block 31 in the destination address region in FIG. 7A, the registers 20, 21 hold the image data (shown hatched) at the righthand end of the source address region. The first selector 22 outputs image data corresponding to 32 dots, which image data are composed of parallel output image data from the registers 20, 21.

The shift circuit 23 shifts the output image data from the first selector 22 to the left by an interval corresponding to (Do−So) dots, and supplies the shifted image data to the second selector 24. The second selector 24 selects image data corresponding to 16 dots in the lefthand half of the output image data from the shift circuit 23, and supplies the selected image data to the memory controller 15. The memory controller 16 then writes the supplied image data into the pixel block, which is second to the last, in the destination address region.

To write image data into the final pixel block 31 in the destination address region, the second selector 24 selects image data corresponding to 16 dots in the righthand half of the output image data from the shift circuit 23, and supplies the selected image data to the memory controller 16. Thus, the image data can be written into the destination address region without reading the pixel block from source address region.

FIGS. 9A through 9D show image data to be transferred in a leftward direction, with the horizontal absolute addresses decreasing to the left. Broken lines in FIGS. 9A through 9D represent boundaries between pixel blocks. As with the image data shown in FIGS. 7A through 7D, the starting point of the source address region and the starting address of the destination address region are shown as belonging to the same pixel address for illustrative purpose.

FIG. 9A shows image data with Do<So, the number of pixel blocks occupied by image data (shown hatched) to be transferred from the source address region being smaller than the number of of pixel blocks occupied by image data (shown hatched) transferred to the destination address region by 1. In this case, a cycle of reading any image data from the pixel block at the lefthand end of the source address region can be dispensed with, and the decision circuit 18 sets the non-reading signal NRD to the high level of "1."

In FIG. 9B, an amount of saved image data (indicated by a value produced by subtracting the number of dots of written image data from the number of dots of read image data) is equal to (So−Do) dots, and the final pixel block in the destination address region contains (De−1) dots. Since the final reading cycle can be omitted, the following relationship is satisfied:

$$(16-De)\leqq(So-Do) \quad (6).$$

For example, if So=8 and Do=4, then since So−Do=4, then the formula (6) is satisfied insofar as the De has a value in the range of from 0 to 11, and the non-reading signal NRD has a high level of "1", resulting in non-reading of image data. If, however, De is 12, then since the formula (6) is not satisfied, the level of the non-reading signal NRD becomes "0", and the final reading cycle is carried out.

If So=Do, then since the image data has the same length before and after they are transferred, the equation De=Se is satisfied. Therefore, it is not necessary to pre-read the image data, no excessive image data have been read, and it is not possible to dispense with the final reading cycle, with the result that the non-reading signal NRD has the low level of "0."

FIG. 9C shows image data with So<Do, the number of pixel blocks occupied by image data to be transferred from the source address region being equal to the number of of pixel blocks occupied by image data transferred into the destination address region. In this case, since the image data in one pixel block have been pre-read as with the image data transfer shown in FIGS. 4A and 4B and the final reading cycle in the source address region can be omitted, the non-reading signal NRD is set to the high level of "1." The amount of saved image data in the pre-reading cycle is equal to {16−(Do−-So)}, and the final pixel block in the destination address region contains (16−De) dots. Since the final reading cycle can be dispensed with, the following relationship is satisfied:

$$(16-De) \leqq \{16-(Do-So)\} \quad (7).$$

However, if the source address region occupies pixel blocks that are one more than the pixel blocks occupied by the destination address region as shown in FIG. 9D, even though So<Do, then since the final reading cycle cannot be omitted, the non-reading signal NRD is set to the low level of "0."

For example, if So=4, Do=8, then since Do−-So=4, the the formula (7) is satisfied insofar as the De has a value ranging from 4 to 15, resulting in non-reading of image data. If, however, De is 3, then since the formula (7) is not satisfied, non-reading of image data does not take place.

The above conditions are summarized as follows: In order for the non-reading signal NRD to be of the high level of "1" when the image data are to be transferred in the direction in which the addresses decrease, the following condition (f) must be satisfied:

Condition (f):

$$\{Do<So \text{ and } (16-De) \leqq (So-Do)\}$$

or $$\{So<Do \text{ and } (16-De) \leqq (16-(Do-So)\}.$$

The condition (f) may be modified into the following condition (g):

Condition (g):

$$\{Do<So \text{ and } (16-De) \leqq (Do-So)\}$$

or $$\{So<Do \text{ and } (Do-So) \leqq De\}.$$

With the process of determining the condition (e) being applied to the condition (g), the final condition (h) to be satisfied for non-reading of the image data when the image data are to be transferred in the leftward direction is as follows:

Condition (h):

$$Do \neq So$$

and $$De \geqq (Do-So)$$

with the code bit neglected.

When the condition (h) is satisfied and the image data are to be transferred in the leftward direction, the decision circuit 18 sets the non-reading signal NRD to the high level of "1" in order to non-read the image data.

With the present invention, as described above, the pre-reading signal PRD and the non-reading signal NRD are determined both when the image data are to be transferred in the direction in which the addresses increase and when the image data are to be transferred in the direction in which the addresses decrease. Accordingly, the pre-reading signal PRD and the non-reading signal NRD can be determined quickly with a relatively simple circuit arrangement. When the image data are to be transferred in blocks, whether a pixel block in the source address region is to be pre-read or non-read can be determined quickly and accurately with a relatively simple circuit arrangement. Therefore, the efficiency with which the image data are transferred can be optimized, resulting in an increase in the rate at which the image data are transferred.

Each pixel block may contain image data composed of a plurality of dots or pixels other than 16 dots or pixels. The principles of the present invention are applicable to the transfer of blocks of image data from one image memory to another image memory.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. An apparatus for transferring blocks of image data, comprising:

an image memory having blocks each composed of a plurality of dots, the blocks being indicated by respective block addresses;

source address control means for storing relative addresses relative to a given position within a data block, of starting and ending pixel points in a source address region containing image data to be transferred, and for supplying the block addresses of blocks between the relative addresses of the starting and ending pixel points in the source address region successively to said image memory;

destination address control means for storing relative addresses of starting and ending pixel points in a destination address region to which the image data are to be transferred, and for supplying the block addresses of blocks between the relative addresses of the starting and ending pixel points in the destination address region successively to said image memory;

image data transferring means for processing and writing the image data read from the blocks indicated by said block addresses in the source address region in said image memory into the blocks indicated by said block addresses in the destination address region in said image memory;

decision means for generating a pre-reading signal and a non-reading signal from a relative address So of the starting pixel point in the source address region, a relative address Do of the starting point in the destination address region, and a relative address De of the ending point in the destination address region;

said decision means comprising means for setting said pre-reading signal if the condition:

$$Do < So$$

is satisfied when the image data are to be transferred in a direction in which successive addresses increase, or if the condition:

$$So < Do$$

is satisfied when the image data are to be transferred in a direction in which successive addresses decrease;

said decision means further comprising means for setting said non-reading signal if the condition as satisfied $$Do \neq So;$$

said image data transferring means comprising means for reading image data corresponding to first two blocks in the source address region in said image memory and generating image data corresponding to a first block in the destination address region from said image data corresponding to the first two blocks when said pre-reading signal is set; and said image data transferring means further comprising means for writing image data corresponding to a final block in the destination address region in said image memory without reading final image data from said image memory when said non-reading signal is set.

* * * * *